United States Patent Office 3,192,251
Patented June 29, 1965

3,192,251
PREPARATION OF ESTERS OF CYCLOTRIENE HYDROCARBONS
Roy A. Gray, Bartlesville, Okla., assignor to Phillips Petroleum Company, a corporation of Delaware
No Drawing. Filed Sept. 18, 1961, Ser. No. 138,593
14 Claims. (Cl. 260—487)

This invention relates to novel esters and their formation. In one aspect this invention relates to novel esters formed by reacting a cyclotriene hydrocarbon with a halogenated acid. In another aspect this invention relates to a process for reacting a cyclotriene hydrocarbon with a halogenated acid to form novel ester compounds.

It has recently been disclosed by G. Wilke in Angew. Chem. 69, 397–8 (1957), that butadiene can be trimerized in 80 percent yield to trans, trans, cis-1,5,9-cyclododecatriene. This trimerization is carried out by means of a catalyst system comprising an organoaluminum such as triethylaluminum in conjunction with a metal halide such as titanium tetrachloride. The cyclic triene which is formed boils at 100–101° C. at 11 mm. Hg absolute pressure. Thus, this synthesis represents a method of preparing a 12-carbon compound from a compound of much lower molecular weight.

I have now discovered that cyclotrienes prepared by trimerizing 1,3-butadiene, or related compounds such as isoprene and piperylene, can be reacted with halogenated organic acids to form novel ester compounds. Thus, broadly speaking, the present invention resides in: novel ester compounds; and methods of preparing said novel ester compounds by reacting a cyclotriene compound with a halogenated organic acid.

An object of this invention is to provide novel ester compounds. Another object of this invention is to provide a process for preparing said novel ester compounds. Still another object of this invention is to provide a process for preparing novel ester compounds by reacting a halogenated organic acid with a cyclotriene compound under ester forming conditions. Still another object of this invention is to provide a process comprising reacting an organic carboxylic acid containing at least one chlorine atom or one fluorine atom attached to a carbon atom which is alpha to the carboxyl group in said acid with a cyclotriene hydrocarbon such as trans, trans, cis-1,5,9-cyclododecatriene. Still another object of this invention is to provide a process for converting cyclotriene hydrocarbons to alcohols. Other aspects, objects, and advantages of the invention will be apparent to those skilled in the art in view of this disclosure.

Thus, according to the invention, there is provided a process for the preparation of an ester of a halogenated acid, which process comprises: contacting a cyclotriene hydrocarbon containing from 12 to 15 carbon atoms per molecule with a halogen-containing acid under ester forming conditions, said acid being characterized by the following structural formula

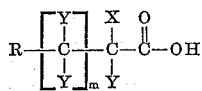

wherein: *m* is an integer of from 0 to 4; X is selected from the group consisting of fluorine and chlorine; R is selected from the group consisting of hydrogen, fluorine, chlorine, and

and Y is selected from the group consisting of hydrogen, fluorine, chlorine,

and

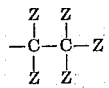

wherein Z is selected from the group consisting of hydrogen, fluorine, and chlorine; and recovering said ester from the resulting reaction mixture.

Further according to the invention, there are provided novel ester compounds prepared in accordance with the process described in the preceding paragraph.

It is to be noted that the organic carboxylic acids used in the practice of the invention have at least one halogen atom selected from the group consisting of chlorine and fluorine attached to a carbon atom which is alpha to the carboxyl group. The presence of said halogen atoms on the alpha carbon atom provides an acid having sufficient acidity to react with the cyclotriene hydrocarbons. It is also to be noted that in accordance with the above formula, the minimum number of carbon atoms which can be present in said acids is two, while the maximum number of carbon atoms which can be present in said acids is 25. It is presently preferred to use acids in accordance with the above formula which contain from 2 to 8 carbon atoms per molecule. If desired aqueous solutions of said acids can be used. For best results said solutions should contain at least about 70 weight percent of the acid. Generally speaking, it is more preferred to use the more concentrated acids in order to obtain more favorable reaction rates.

Examples of organic acids which can be used in the practice of the invention include, among others, the following:

fluoroacetic acid,
chloroacetic acid,
difluoroacetic acid,
trifluoroacetic acid,
trichloroacetic acid,
2,3,3-trifluoropropionic acid,
3,3-difluoro-2-chloropropionic acid,
2,2,4-trifluorobutyric acid,
2,3,4-trichlorobutyric acid,
2,2,3,3,3-pentafluoropropionic acid,
2,2,3,3-tetrachlorobutyric acid,
heptafluorobutyric acid,
2,5,5,5-tetrafluorovaleric acid,
2,3-dichloro-4,4,5-trifluorovaleric acid,
2-(trichloromethyl)-2,4,5-trichlorovaleric acid,
nonafluorovaleric acid,
2-(1,1-difluoroethyl)-2,4,5,5,5-pentafluorovaleric acid,
2,3-dichloro-4,5,5,6,6-pentafluorocaproic acid,
2,3,4,5-penta(chloromethyl)-2,6,6,6-tetrafluorocaproic acid,
2,2-difluoromalonic acid,
2,2,3-trichlorosuccinic acid,
tetrafluorosuccinic acid,
2,3,3,4-tetrafluoroglutaric acid,
3-methyl-2,2,3,4,4-pentachloroglutaric acid,
3-(pentachloroethyl)-2,2-difluoroglutaric acid,
octafluoroadipic acid,
2-(fluoromethyl)-4-(1,2-difluoroethyl) - 2,3,4,5,5-pentafluoroadipic acid, 2,2,6,6-tetrafluoropimelic acid,
2-fluoro-2,3,3,4,4,5,5,6,6 - nona(pentachloroethyl)pimelic acid,
and the like.

In one method for carrying out the process of the invention, the cyclotriene hydrocarbon and the halogen containing acid are contacted in any suitable reaction vessel at a temperature usually within the range of from 0 to 150° C. Atmospheric pressure is usually satisfactory for said contacting operation, although sufficient superatmospheric pressure to maintain the reaction mixture substantially completely in liquid phase should be employed if a reaction temperature above the boiling point of either of the reactants or any diluent is used. Generally speaking, the higher the halogen to carbon ratio in the organic acid, the greater will be the acidity of said acid. One can generally obtain satisfactory reaction rates at lower temperatures by using the stronger acids. Therefore, as will be understood by those skilled in the art, the specific reaction conditions will be chosen with regard to the specific reactants used.

The contacting of the organic acid and the cyclotriene hydrocarbon can be carried out in the absence or presence of a suitable solvent, as desired. Any solvent which is non-reactive with the reagents being used or the product being prepared, i.e., which is inert under the reaction conditions, and which is a solvent for both of said reactants and the reaction product, is a suitable solvent for use in the practice of the invention. When a solvent is used, the volume ratio of solvent to cyclotriene hydrocarbon is generally within the range of 0.5:1 to 5:1. Paraffin, isoparaffin, and cycloparaffin hydrocarbons and ethers containing from 4 to 10 carbon atoms per molecule are quite useful as suitable solvents in the practice of the invention. Some specific examples of such solvents are pentane, isopentane, isooctane, n-decane, cyclohexane, methyl cyclohexane, dioxane, trioxane, the dimethyl ether of diethylene glycol, the diethyl ether of diethylene glycol, the diethyl ether of ethylene glycol, the dimethyl ether of ethylene glycol, and the dibutyl ether of diethylene glycol.

In the practice of the invention, the mol ratio of halogen containing acid to cyclotriene hydrocarbon will usually be within the range of 0.25:1 to 4:1.

The contacting or reaction time will be governed by such factors as temperatures, the specific reactants used, and acid to cyclotriene hydrocarbon ratio, but will generally be within the range of from 0.5 to 24 hours. Reaction times of less than five hours are frequently used. Following the contacting of the acid with the cyclotriene hydrocarbon, the product obtained can be recovered from the resulting reaction mixture by any suitable method. According to one presently preferred method, it is convenient to wash the reaction mixture with a basic material such as a dilute aqueous alkali metal hydroxide solution to remove any excess acid reactant. Said washing is carried out at a sufficiently low temperature, such as room temperature, to avoid saponification of the ester. If the reaction was carried out in the absence of a solvent, it is often desirable to add an extracting material or solvent for the reaction product prior to the basic wash. The product can then be recovered from the solvent phase by fractionation or other suitable means.

An unusual feature of the invention is that the ester group of the reaction product contains only one carbon to carbon double bond. This was surprising in view of the fact that the hydrocarbon reactant of the invention is a cyclotriene hydrocarbon containing three carbon to carbon double bonds. This surprising feature of the invention is best illustrated by describing a specific embodiment of the invention wherein a specific halogenated acid and a specific cyclotriene hydrocarbon are reacted. It is presently believed that the formation of the ester of the invention occurs through addition of the halogen containing acid to a carbon to carbon double bond of the cyclotriene hydrocarbon. Thus, if one reacts trans, trans, cis-1,5,9-cyclododecatriene having an empirical formula of $C_{12}H_{18}$ and having the following structural formula

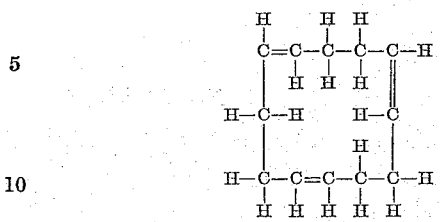

with trifluoroacetic acid having the formula

one would expect a compound having the formula

wherein the R″ group is a 12 carbon hydrocarbon group containing two carbon to carbon double bonds.

However, as shown conclusively in the examples given hereinafter, said R″ group contains only one carbon to carbon double bond. Therefore, isomerization of said R″ group, as well as the formation of the ester, has occurred. It is not presently known whether or not the addition of the halogen-containing acid to the double bond occurs before, during, or after the rearrangement of the structure of said R″ group to give a hydrocarbon group containing only one carbon to carbon double bond. Therefore, the invention is not to be limited to any specific series or sequence of steps which may occur in the reaction mechanism involved in the invention.

The following examples will serve to further illustrate the invention.

EXAMPLE I

A run was carried out in which trans, trans, cis-1,5,9-cyclododecatriene (referred to hereinafter for convenience as CDT) was reacted with pentafluoropropionic acid.

In this run, 32.4 grams of CDT (0.2 mol) and 32.8 grams (0.2 mol) of pentafluoropropionic acid were charged to a 100 ml. distillation pot which was equipped with a condenser. The mixture was then heated to 120° C. and maintained at this temperature for two hours. During the heating period, the mixture became quite dark. The reaction mixture was then cooled to room temperature, water and pentane were added, and the layers separated. The pentane layer was then washed with dilute aqueous sodium hydroxide and then with water. The material was then dried, the pentane was stripped off, and the remaining material was fractionated in a ½-inch by 8-inch packed column. The results of this fractionation are shown below in Table I.

*Table I*

| Fraction | Boiling Range, °C. | Pressure, mm. Hg | Wt., Grams | $n_D^{20}$ |
|---|---|---|---|---|
| 1 | 47–52 | 0.5 | 2.4 | 1.4965 |
| 2 | 52–62 | 0.6 | 1.6 | 1.4908 |
| 3 | 62–77 | 0.75 | 2.9 | 1.4408 |
| 4 | 57–58 | 0.1 | 17.3 | 1.4306 |
| 5 | 58–60 | 0.1 | 1.6 | 1.4304 |

The pot residue from this fractionation amounted to 17.6 grams.

It is apparent that the material in the above fractionation was not the starting material, since the refractive index $n_D^{20}$ of CDT is 1.5070–1.5080.

A sample of Fraction 4 from the above Table I was analyzed for carbon and hydrogen. The calculated carbon and hydrogen analyses for $C_{15}H_{19}F_5O_2$ (molecular weight=326) is carbon=56.1 and hydrogen=6.0. The results from the actual analyses of said Fraction 4 were carbon=55.3 and hydrogen=5.8, all figures being in weight percent.

An infrared analysis of Fraction 4 showed the presence of a carbonyl group and carbon-fluorine bonds.

Hydrogenation of a 0.774 gram sample of Fraction 4 from the above Table I was carried out in ethanol at 25° C. and 739 millimeters Hg pressure in the presence of a platinum catalyst. During said hydrogenation said sample absorbed 57 milliliters of hydrogen. Based on a molecular weight of 326, each double bond would absorb 61.5 milliliters of hydrogen at the above conditions. Thus, the material being hydrogenated must have contained only one carbon to carbon double bond. Since the above-described carbon-hydrogen analyses were consistent with the empirical formula $C_{15}H_{19}F_5O_2$, it is apparent that the ester product has the following formula

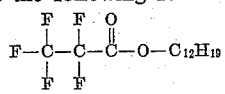

and that the carbon to carbon double bond is in the $C_{12}H_{19}$ group.

EXAMPLE II

In another run, 34.2 grams (0.3 mol) of trifluoroacetic acid was added to 48.6 grams (0.3 mol) of CDT over a 30-minute period at 70° C. The mixture was stirred during the addition, and stirring was continued for an additional 4.5 hours at 70° C. The reaction mixture was then cooled, pentane and water were added, and the layers separated. The pentane layer was then washed with diulte aqueous sodium hydroxide solution, then washed with water, and then dried. After flashing off the pentane, fractionation of the remaining material yielded 8 grams of CDT, 20.5 grams of liquid products and 25.5 grams of pot residue. During said fractionation said liquid products were collected in fractions. One of said fractions, a center cut containing most of the distillate, boiled at 67° C. at 0.3 mm. Hg and had a refractive index $n_D^{20}$ of 1.4475.

Hydrogenation of a 0.229 gram sample of said center cut in ethanol in the presence of a platinum catalyst at 26.5° C. and 743 mm. Hg was then carried out. Said sample absorbed 23.7 ml. hydrogen. Based on a molecular weight of 276, each double bond would absorb 21.6 ml. hydrogen at these conditions. Thus, the material being hydrogenated must have contained only one carbon to carbon double bond.

EXAMPLE III

Another run was carried out by the procedure of Example II except that a 2/1 mole ratio of acid to CDT was used. In this run, 68.4 grams (0.6 mol) of trifluoroacetic acid was added while stirring to 48.6 grams (0.3 mol) of CDT. The addition was begun at room temperature, and it was necessary to cool the reaction mixture to maintain the temperature thereof at about 30° C. After all of the acid had been added, stirring was continued for two hours. The reaction product was then recovered by the same procedure described in Example II. Fractionation yielded 18 grams of CDT, 16.5 grams of liquid product, and 18 grams of pot residue. During said fractionation said liquid product was collected in fractions. One of said fractions, a center cut containing most of the distillate, boiled at 52° C. at 0.05 mm. Hg and had a refractive index $n_D^{20}$ of 1.4480.

The novel esters of the invention can be used as intermediates in the preparation of alcohols. Said esters can be readily converted into the corresponding alcohol by methods such as saponification with a basic material such as aqueous sodium hydroxide under saponification conditions, hydrolysis by refluxing with water, and alcoholysis with alcohols such as methanol or ethanol using dry hydrogen chloride or sodium as catalyst. Said alcohols can be esterified with phthalic acid and the resulting phthalate is useful as a plasticizer for vinyl resins.

When the esters of the invention are to be converted into the corresponding alcohols it is preferred to use the fluoroesters because the carbon-fluorine bond is much more resistant to hydrolysis than the carbon-chlorine bond. Thus, when saponification is used to convert the fluoroester into the corresponding alcohol, said alcohol can be recovered by crystallization, and the remaining fluoroacid salt can be acidified with a strong acid such as sulfuric acid or hydrochloric acid to regenerate the fluoroacid which can be recovered by any suitable method such as distillation or extraction and reused to prepare more ester. Thus, in this respect, the above defined fluoroacids are preferred to the chloroacids in the practice of the invention.

While the invention has been described above with particular reference to using trans, trans, cis-1,5,9-cyclododecatriene in forming the novel esters of the invention, trans, trans, trans-1,5,9-cyclododecatriene can also be used in the practice of the invention. It is also within the scope of the invention to use derivatives and homologues of said cyclotrienes, particularly those derivatives having various substituents, such as alkyl radicals, attached to the ring carbon atoms. Thus, it is within the scope of the invention to use the cyclic trimers of isoprene and piperylene (1,3-pentadiene) in the practice of the invention. The trimers of both of said last-mentioned dienes are trimethylcyclododecatrienes having an empirical formula of $C_{15}H_{24}$. In the case of the isoprene trimer, each of the three methyl groups is attached to a carbon atom which is attached to an adjacent carbon atom by a double bond. In the piperylene trimer the methyl groups are attached to an adjacent carbon atom by a double bond. In the piperylene trimer the methyl groups are attached to carbon atoms which are attached to adjacent carbon atoms by single bonds.

Although the process of the invention has been described as a batch operation, it will be apparent to those skilled in the art that a continuous system can be employed without deviating from the inventive concept disclosed herein.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for the preparation of a monoester derivative of a cyclotriene hydrocarbon, said monoester compound containing only one carbon to carbon double bond in the ester group thereof, which process comprises: reacting a cyclotriene hydrocarbon selected from the group consisting of monocyclictriene hydrocarbons having 12 carbon atoms in the ring and carbon to carbon double bonds in the 1, 5, and 9 positions in said ring and trimethyl derivatives thereof with a halogen-containing acid in a reaction zone, said acid being characterized by the following structural formula

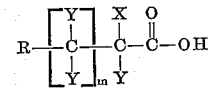

wherein: $m$ is an integer of from 0 to 4; X is selected from the group consisting of fluorine and chlorine; R is selected from the group consisting of hydrogen, fluorine, chlorine, and

and Y is selected from the group consisting of hydrogen, fluorine, chlorine,

and

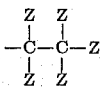

wherein Z is selected from the group consisting of hydrogen, fluorine, and chlorine; said acid and said cyclododecatriene being contacted in said reaction zone in an acid to cyclododecatriene mol ratio within the range of from 0.25:1 to 4:1 to 2:1, at a temperature within the range of from about 0 to 150° C., under sufficient pressure to maintain said reactants in liquid phase, and for a period of time within the range of from about 0.5 to about 24 hours; and recovering said monoester compound from the resulting mixture.

2. The process of claim 1 wherein said cyclotriene hydrocarbon is trans, trans, cis-1,5,9-cyclododecatriene.

3. The process of claim 1 wherein said cyclotriene hydrocarbon is trans, trans, trans-1,5,9-cyclododecatriene.

4. The process of claim 1 wherein said cyclotriene hydrocarbon is trimethyl-trans, trans, cis-1,5,9-cyclododecatriene.

5. The process of claim 1 wherein said cyclotriene hydrocarbon is trimethyl-trans, trans, trans-1,5,9-cyclododecatriene.

6. The process of claim 1 wherein said acid is pentafluoropropionic acid.

7. The process of claim 1 wherein said acid is trifluoroacetic acid.

8. The process of claim 1 wherein said acid is trichloroacetic acid.

9. The process of claim 1 wherein said reaction of said cyclotriene hydrocarbon and said acid is carried out in the presence of a suitable organic solvent which is inert under the reaction conditions.

10. A process for the preparation of a monoester derivative of a cyclotriene hydrocarbon, which process comprises: reacting trans, trans, cis-1,5,9-cyclododecatriene with pentafluoropropionic acid; said acid and said cyclododecatriene being contacted in a reaction zone in an acid to cyclododecatriene mol ratio within the range of from 0.25:1 to 4:1, at a temperature within the range of from 0 to 150, under sufficient pressure to maintain said reactants in liquid phase, and for a period of time within the range of from 0.5 to 24 hours; and recovering said ester compound from the resulting reaction mixture, the ester group of said ester compound containing only one carbon to carbon double bond.

11. A process for the preparation of a monoester derivative of a cyclotriene hydrocarbon, which process comprises: reacting trans, trans, cis-1,5,9-cyclododecatriene with trifluoroacetic acid; said acid and said cyclododecatriene being contacted in a reaction zone in an acid to cyclododecatriene mol ratio within the range of from 0.25:1 to 4:1, at a temperature within the range of from 0 to 150° C., under sufficient pressure to maintain said reactants in liquid phase, and for a period of time within the range of from 0.5 to 24 hours; and recovering said ester compound from the resulting reaction mixture, the ester group of said ester compound containing only one carbon to carbon double bond.

12. An ester product prepared in accordance with the process of claim 1.

13. An ester product prepared in accordance with the process of claim 1 wherein said acid is pentafluoropropionic acid and said cyclotriene hydrocarbon is trans, trans, cis-1,5,9-cyclododecatriene.

14. An ester product prepared in accordance with the process of claim 1 wherein said acid is trifluoroacetic acid and said cyclotriene hydrocarbon is trans, trans, cis-1,5,9-cyclododecatriene.

References Cited by the Examiner

UNITED STATES PATENTS

| | | | |
|---|---|---|---|
| 2,426,725 | 9/47 | Bruson | 260—487 |
| 2,598,262 | 5/52 | Johnson et al. | 260—497 X |
| 3,026,357 | 5/62 | Scott | 260—497 X |

LORRAINE A. WEINBERGER, *Acting Primary Examiner.*

TOBIAS E. LEVOW, LEON ZITVER, *Examiners.*

UNITED STATES PATENT OFFICE
CERTIFICATE OF CORRECTION

Patent No. 3,192,251     June 29, 1965

Roy A. Gray

It is hereby certified that error appears in the above numbered patent requiring correction and that the said Letters Patent should read as corrected below.

Column 7, line 10, strike out "to 2:1; line 15, after "resulting" insert -- reaction --; column 8, line 2, for "150" read -- 150° C. --.

Signed and sealed this 10th day of May 1966.

(SEAL)
Attest:

ERNEST W. SWIDER
Attesting Officer

EDWARD J. BRENNER
Commissioner of Patents